United States Patent

Reddy et al.

[11] Patent Number: 5,618,318
[45] Date of Patent: Apr. 8, 1997

[54] METHOD FOR FORMING A FOLDED ELECTRODE CONFIGURATION FOR GALVANIC CELLS

[75] Inventors: Thomas B. Reddy, Bronxville; Pedro Rodriquez, Ossining, both of N.Y.

[73] Assignee: Power Conversion, Inc., Elmwood Park, N.J.

[21] Appl. No.: 614,199

[22] Filed: Mar. 12, 1996

Related U.S. Application Data

[62] Division of Ser. No. 305,439, Sep. 13, 1994, Pat. No. 5,525,441.

[51] Int. Cl.$^6$ .............................. H01M 6/18; H01M 10/38
[52] U.S. Cl. ........................................ 29/623.1; 429/192
[58] Field of Search ............................ 29/623.1; 429/192

[56] References Cited

U.S. PATENT DOCUMENTS

3,272,653  9/1966  Solomon et al. ................. 429/229 X
4,948,685  8/1990  Ohsawa et al. ................... 429/213

*Primary Examiner*—John S. Maples
*Attorney, Agent, or Firm*—Breiner & Breiner

[57] ABSTRACT

A high density cell stack is provided utilizing strips of flexible cathode material and flexible anode materials folded over each other at right angles. A suitable anode material is lithium and a suitable cathode material is manganese dioxide. The disclosed cell stacks are rapidly manufactured to provide high density cells with good mechanical stability and good stability against shorting.

8 Claims, 5 Drawing Sheets

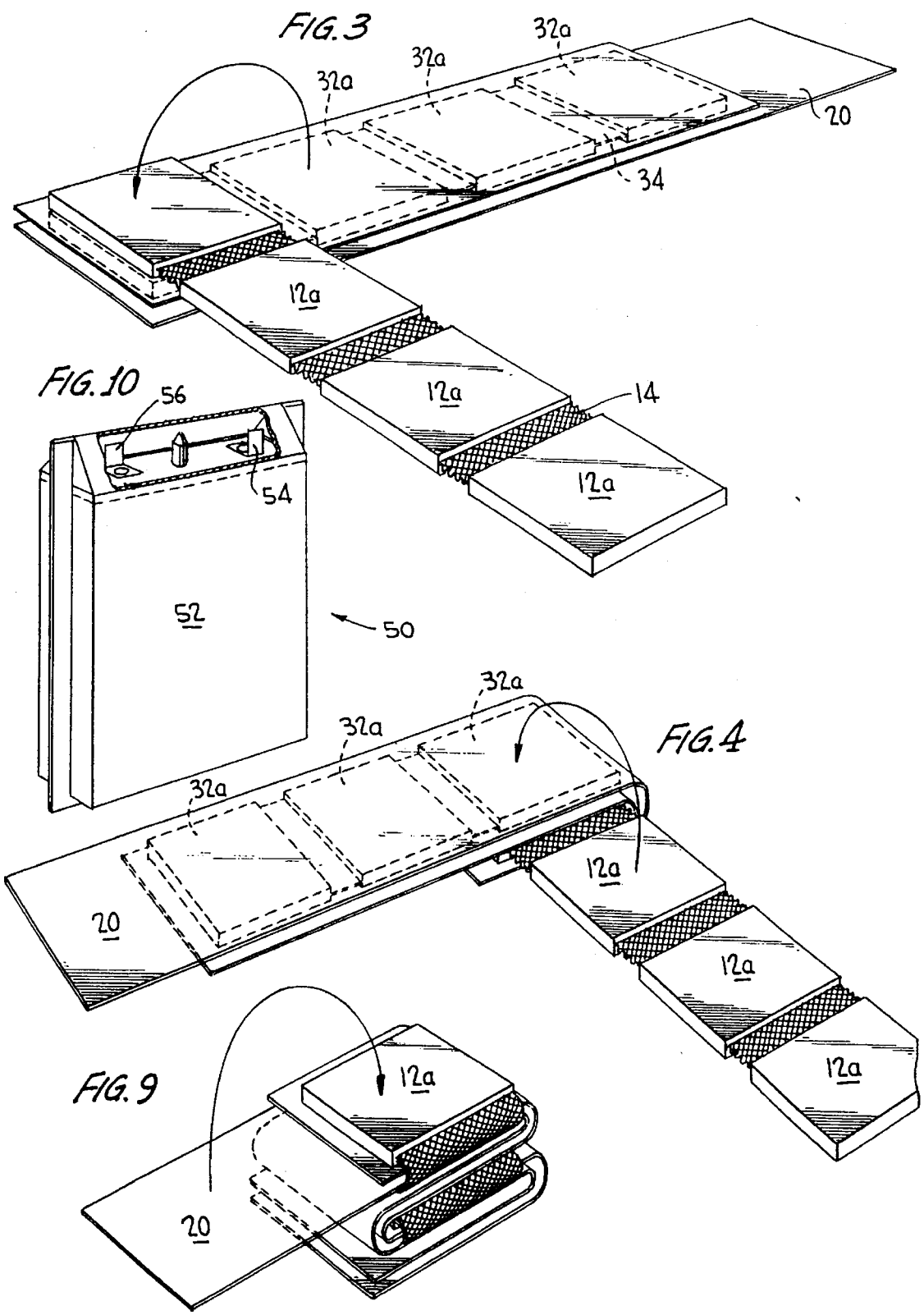

METHOD FOR FORMING A FOLDED ELECTRODE CONFIGURATION FOR GALVANIC CELLS

This is a division of application Ser. No. 08/305,439 filed Sep. 13, 1994, now U.S. Pat. No. 5,525,441.

FIELD OF INVENTION

This invention relates to electrode configurations for electrochemical cells, commonly referred to as batteries, and to the batteries containing the electrodes. More particularly the invention relates to folded electrode configurations and to a method of manufacturing batteries utilizing the folded electrodes.

BACKGROUND OF THE INVENTION

In recent years the demand for high energy density batteries has increased. To provide high energy density batteries a plurality of anodes and cathodes separated by an electrolyte, containing a separator material or a polymeric electrolyte are arranged in stacks with the current being taken off from the electrodes with current collectors. It is desirable that these stacked cells can be rapidly fabricated while at the same time having assurance that the anode and cathodes are constructed to avoid direct electrical contact between the anode and cathodes, thereby shorting out the cells. Additionally, it is desirable that the stack of cells withstand the abuse received in their environment of use.

Accordingly, cell stacks have been fabricated from relatively flexible anodes and cathodes separated by a liquid or paste electrolyte contained in a flexible, porous separator material compatible with the electrolyte or separated by a solid polymer electrolyte which retains its structural integrity. For example, application WO 9407276-A1 describes an electrochemical cell stack comprising a continuous laminate web, having one continuous first polarity electrode layer, one continuous electrolyte layer, and a number of discrete second polarity electrode segments secured on top of the electrolyte layer in predetermined locations. The continuous laminate web is fan-folded at predetermined fold positions such that the second polarity electrode segments contact the electrolyte layer on the top and bottom sides of each of the second polarity electrode segments. The web forms a stack having first and second sides.

Additionally, U.S. Pat. No. 4,092,464 describes a high energy density flexible cell or battery capable of undergoing flexular stress with little effect on its discharge properties either during or after subjection to stress comprising a flexible anode folded over a cathode.

There is a continuing need for improved high energy density cells or batteries which are relatively flexible, capable of rapid construction, have high integrity with regard to shorting out of the cells or battery with good electrolyte stability including leakage and which is of relatively low cost.

SUMMARY OF THE INVENTION

The present invention provides a means of forming a folded electrode configuration for use in primary and secondary (i.e., rechargeable) batteries which is readily manufacturable and provides a lower cost alternative to parallel plate construction for prismatic galvanic cells used in battery construction. A preferred cell configuration employs two planar electrodes which are positioned at right angles to one another, whereby at least one layer of porous, electrically insulating separator material is placed between electrodes of opposite polarity. In an alternative, more preferred embodiment, one of the electrodes is encased in a separator envelope. If required by the mechanical properties of one or both electrodes, blow-off areas, i.e., areas where there is no electrochemically active material, may be spaced periodically along the electrode structure to allow folds to be made at regular intervals. During construction of the electrode structure, the electrodes are folded over each other at right angles to each other giving a prismatic electrode structure which may then be inserted in a prismatic electrode case. This folding operation can be either carried out by hand or by a mechanical assembly structure consisting of lever arms to make the device. Tabs are placed at opposite ends of the electrodes so that when the folded electrode structure is completed, these tabs may be connected to electrical feed-throughs incorporated in the cell case.

In a particularly preferred embodiment, no blow-out areas are required on the electrodes since the electrodes are flexible and may be folded without degradation of their mechanical strength or electrical continuity. Incorporation of one of these electrodes in a separator envelope eliminates possible short circuits during the folding operation and obviates the need to maintain strict registration between the separator and electrodes during the folding operation.

This invention is particularly useful in primary lithium batteries since lithium is quite malleable and may be readily folded but it is also useful in other batteries using other metals such as aluminum or zinc which can also be folded. In the case of lithium, the electrode incorporates a current collector which may be a copper or nickel metal strip, or a foil laminate structure (Li/Cu/Li). Other areas of utility include secondary or rechargeable lithium batteries using liquid or polymeric electrolytes and lithium ion batteries in which lithium is intercalated into a host material such as carbon which has been deposited on a current collector. The preferred embodiment of this invention involves making a lithium/manganese dioxide primary cell with one electrode comprising manganese dioxide containing conductive diluents such as graphite and/or carbon with a binder such as polytetrafluroethylene (PTFE) on an aluminum expanded metal grid. Other grid materials such as stainless steel or nickel may also be employed. The electrode may employ one or more such grids or foils to provide electrical conductivity and mechanical strength in the electrode structure. The other electrode, the anode, consists of lithium metal foil containing a copper metal strip which acts as a current collector. The separator material when employed is preferably micro-porous polypropylene, formed into an envelope which completely encases the anode on three sides, leaving room on one end for the tab to exit the envelope. After folding the electrodes, the tabs are welded to electrical feed-throughs formed by rivets passing through a polymeric header assembly containing an electrolyte fill tube and heat sealed to a foil laminate envelope. After formation of these weldments, the envelope is heat sealed around the electrode structure. The electrochemical cell is then evacuated and filled with a non-aqueous electrolyte consisting of a lithium salt dissolved in a non-aqueous solvent which may be a mixture of non-aqueous, aprotic liquids such as dimethoxyethane, propylene carbonate, butylene carbonate, dioxolane, and the like. Typical lithium salts are lithium perchlorate, lithium hexafluroarsenate, lithium tetraflurophosphate, lithium trifluoramethane sulfonate and lithium bis(Trifluoromethylsulfonyl)imide.

As an alternative to the use of separator materials with liquid electrolytes, polymeric electrolytes may be employed between the electrodes to provide electrolytic conduction between the electrodes but preventing direct contact.

In still another alternative cell design, the folded electrolyte configuration is placed in a foil laminate pouch and the tabs which are covered with thermoplastic material are heat sealed in the seams of the pouch. The cell may be either filled with electrolyte before the final heat sealing of the seams or a needle or fine tube placed in the seam and the cell filled with electrolyte after the tabs are sealed in the seam of the pouch. The needle or fine tube is then withdrawn and the pouch sealed.

In still another embodiment, the prismatic electrode configuration is placed in a metallic, prismatic case, the tabs welded to glass-to-metal feed-throughs in a metallic header which is inserted in the case and the header welded to the case. The cell case is then evacuated through an electrolyte fill tube and the cell back filled with electrolyte. In this instance, a hermetic construction is achieved using the same components as employed in the two embodiments described above.

Other active solid cathode materials such as polycarbon monofluoride (CFx), iron disulfide ($FeS_2$) or cupric oxide (CuO), may also be employed in the cathode.

THE DRAWING AND DETAILED DESCRIPTION

In the drawings,

FIGS. 3–9 show the folding and stacking sequence used in fabricating an electrochemical cell stack illustrating the embodiment shown in FIG. 2.

FIG. 10 is an illustration of the cell stack of FIG. 1 enclosed in a container consisting of a polymeric header and foil laminate sides.

Figure 1:
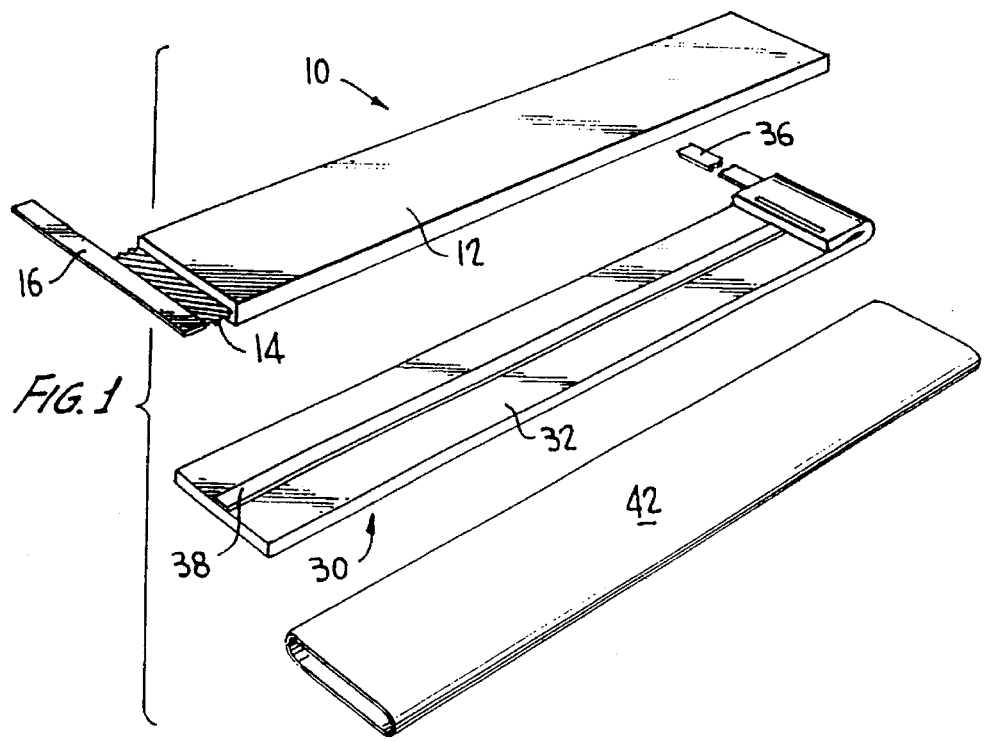
FIG. 1 is an exploded view of a presently preferred first embodiment of the components of a high energy density lithium battery.

A presently preferred embodiment is illustrated in FIG. 1 which is an exploded view of the components of a cell stack. Thus 10 is a flexible cathode strip including current collector 14 embedded in a flexible cathode material 12 with tab 16 being attached to current collector 14 for take off of electrical current. The anode 30 includes a flexible anode material 32. A current collector 38 is in contact with the anode material. Tab 36 is a take off for electrical current. An envelope separator material 42 such as micro-porous polypropylene encases anode 30.

Figure 2:
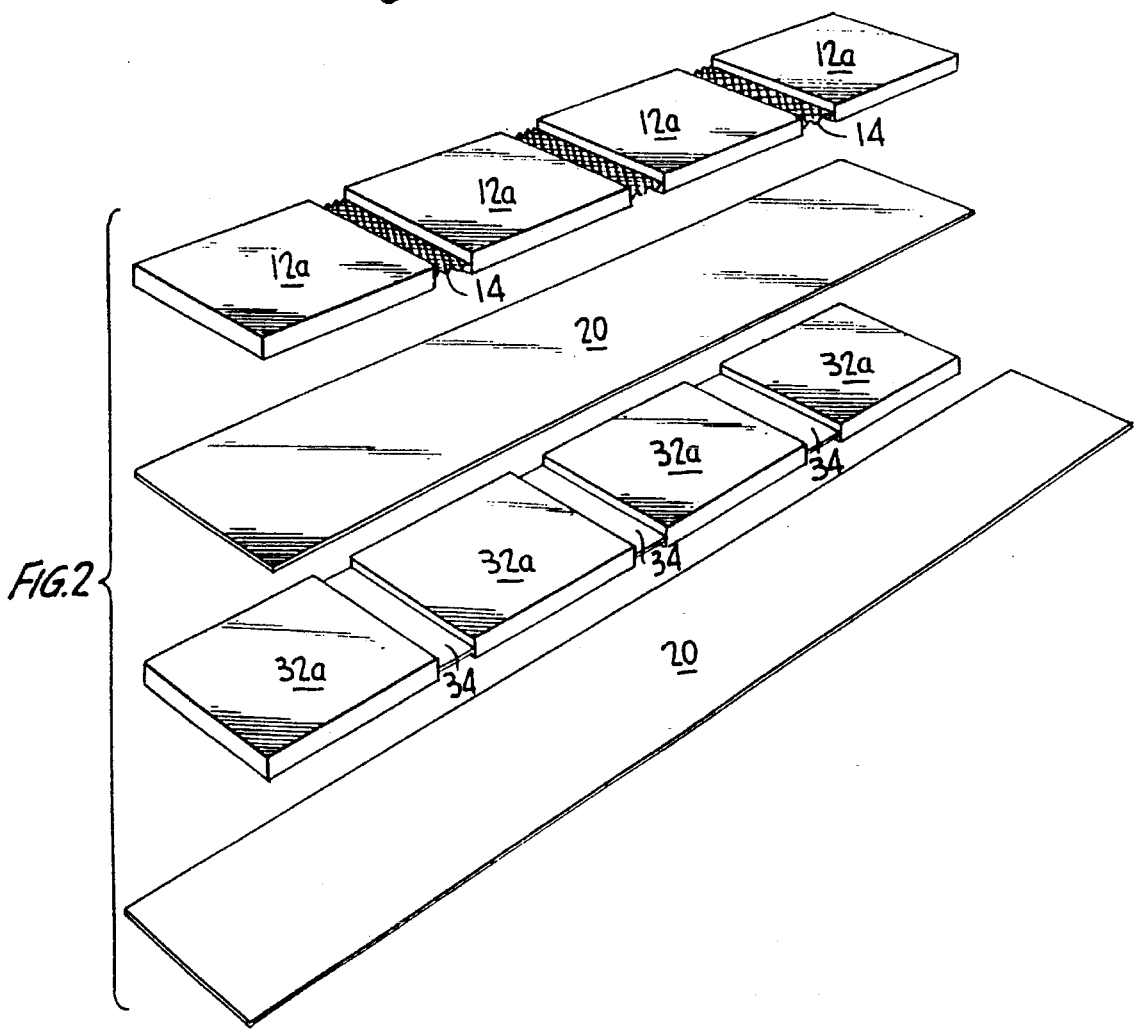
FIG. 2 is an exploded view of a second embodiment of the components of a high energy lithium battery which design includes a blow-off feature on each electrode.
Figure 5:
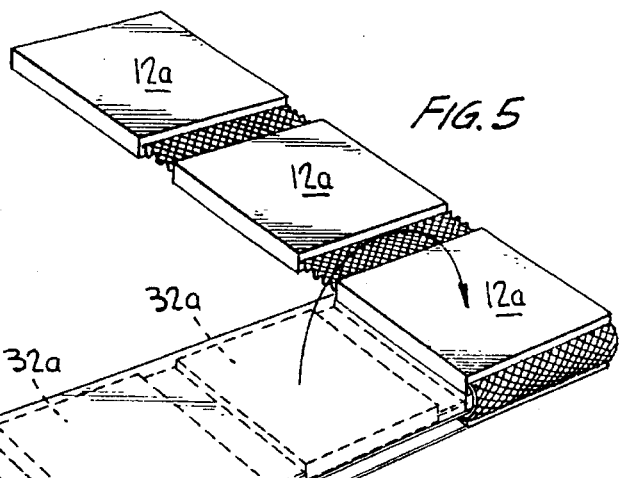
Figure 6:
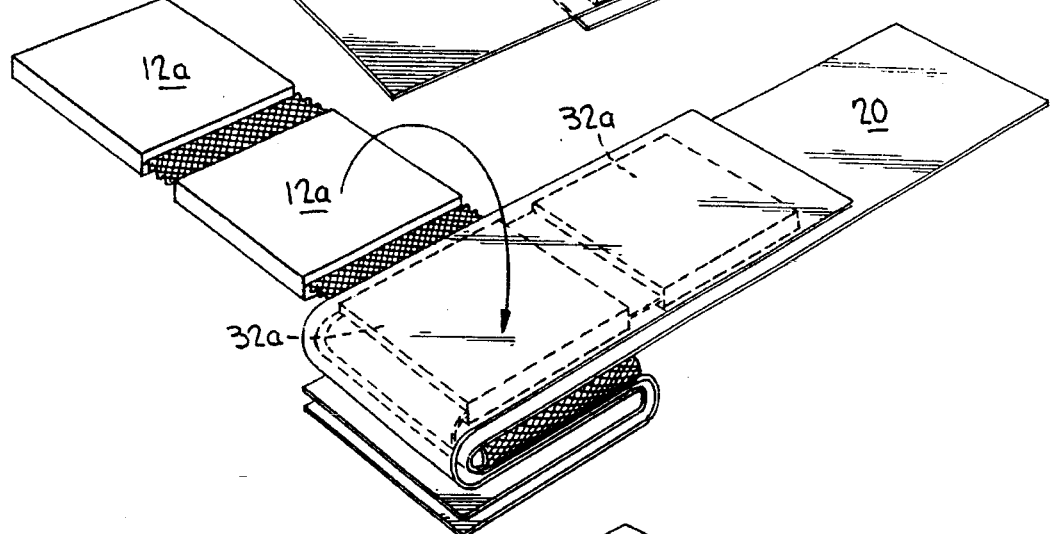
Figure 7:
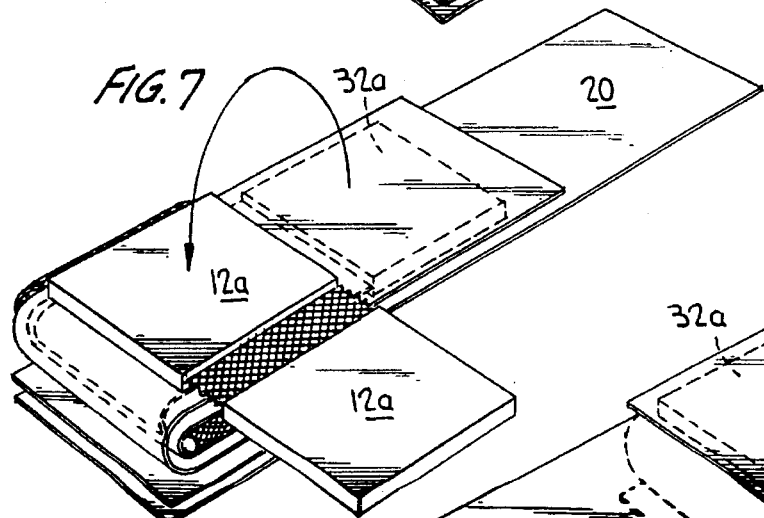
Figure 8:
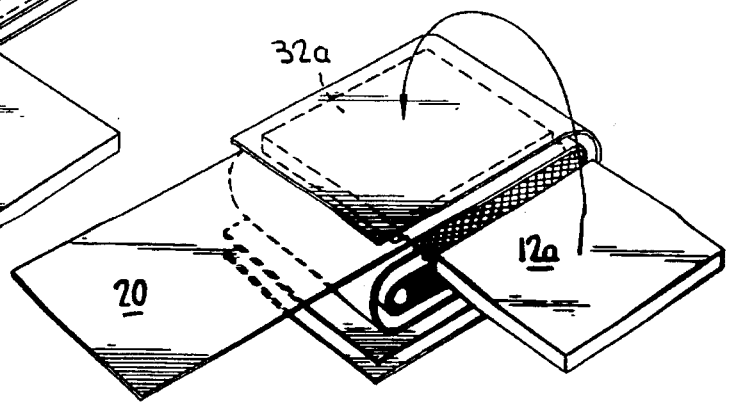

In the embodiment of FIG. 2 a strip containing a plurality of cathodes 12a are interconnected by a current collector 14. As illustrated, there is a space between each of the plurality of cathodes 12a interconnected through a current collector 14. Similarly, there are a plurality of anodes 32a interconnected by a current collector 34. Separator strips 20 are interleaved between the cathodes and anodes. The spacing between electrodes provides a blow-off feature as above disclosed.

FIGS. 3–9 illustrate the assembly of the cell stack. Thus, as shown in FIGS. 3–9, the plurality of anodes 12a and 32a cathodes are folded over each other at right angles to form a final cell stack as shown in FIG. 9. The flexible strips of FIG. 1 do not have the blow-out feature of FIG. 2. However, these strips can also be stacked at right angles because of the flexibility of the strips to again provide a compact cell stack. The cell stacks are encased in a suitable casing 50 as shown in cell stack includes the cell casing 52 which can be of plastic or other non-conductive material and includes current take off members 54 and 56. The cell stack is approximately 2.8 inches in height and 2.6 inches in width. The thickness of the cell stack is approximately 0.50 inches. The design of the present cell provides compactness, stability of electrolyte which is impregnated in a separator material and good stability against electrical shorting of the stacked cells. Moreover, the cell stack can be rapidly manufactured to provide a low cost in the manufacture of high energy density cells having good stability.

Examples of presently preferred operational cells are as follows:

EXAMPLE 1

Figure 11:
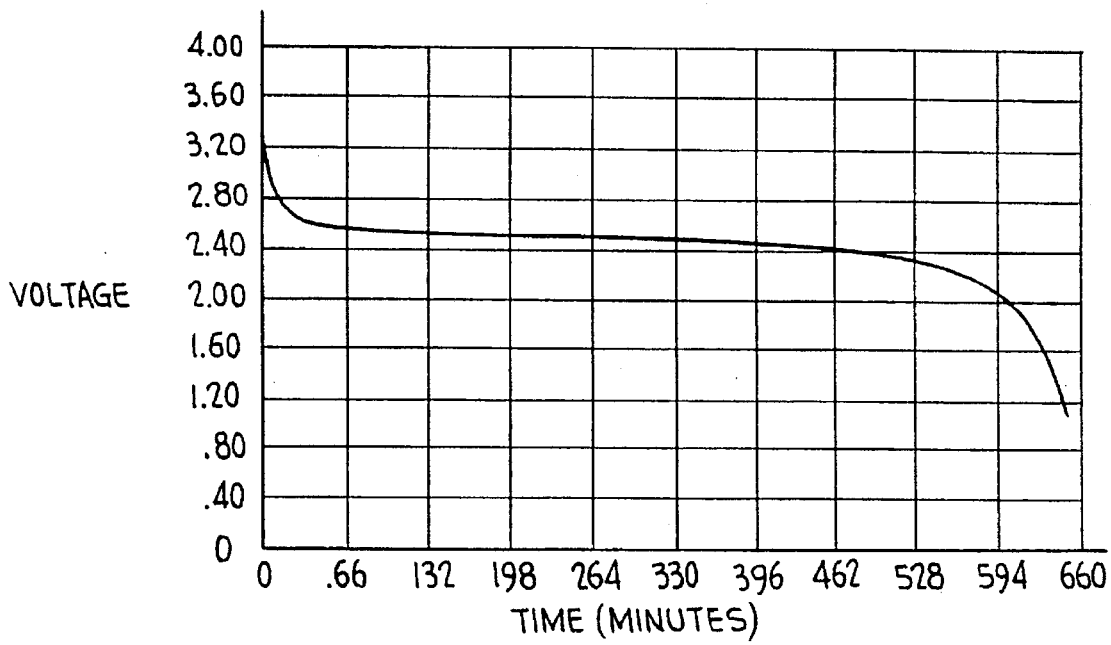
FIG. 11 is a discharge curve for the cell of Example 1.

This cell comprises a heat-sealable foil laminate envelope sealed to a machined polypropylene header containing an electrolyte fill port and riveted electrical feed-throughs adhesively bonded in the header. See FIG. 10. The cathode mix consisted of 86% heat-treated Chemical Manganese Dioxide (CMD), 4% Acetylene Black, 5% graphite and 5% PTFE binder on two aluminum expanded metal current collectors. The anode consisted of a lithium metal foil containing a 0.125 in.×0.003 in. copper metal strip centrally positioned on one side of a aluminum metal. The anode was then sealed in an envelope of microporous polypropylene separator material as shown in FIG. 1. Both electrodes contained tabs. The electrode assembly was folded as shown in FIGS. 3–9 and the tabs welded to the riveted electrical feed-throughs in the header. The foil laminate was folded over the electrode configuration and the seams sealed on three sides with a heat sealer. The cell was then evacuated and filled with an electrolyte consisting of 0.75 Molar lithium trifluromethane sulfonate in a 50/50 mixture of propylene carbonate and dimethoxyethane. The electrolyte was prepared so that it contained less than 100 ppm of water. The fill tube was then sealed shut and the cell discharged at a constant current of 1.00 amps at room temperature. FIG. 11 shows a discharge curve for the cell which provided a capacity of 10.1 amp-hours at an average voltage of 2.25 volts.

EXAMPLE 2

Figure 12:
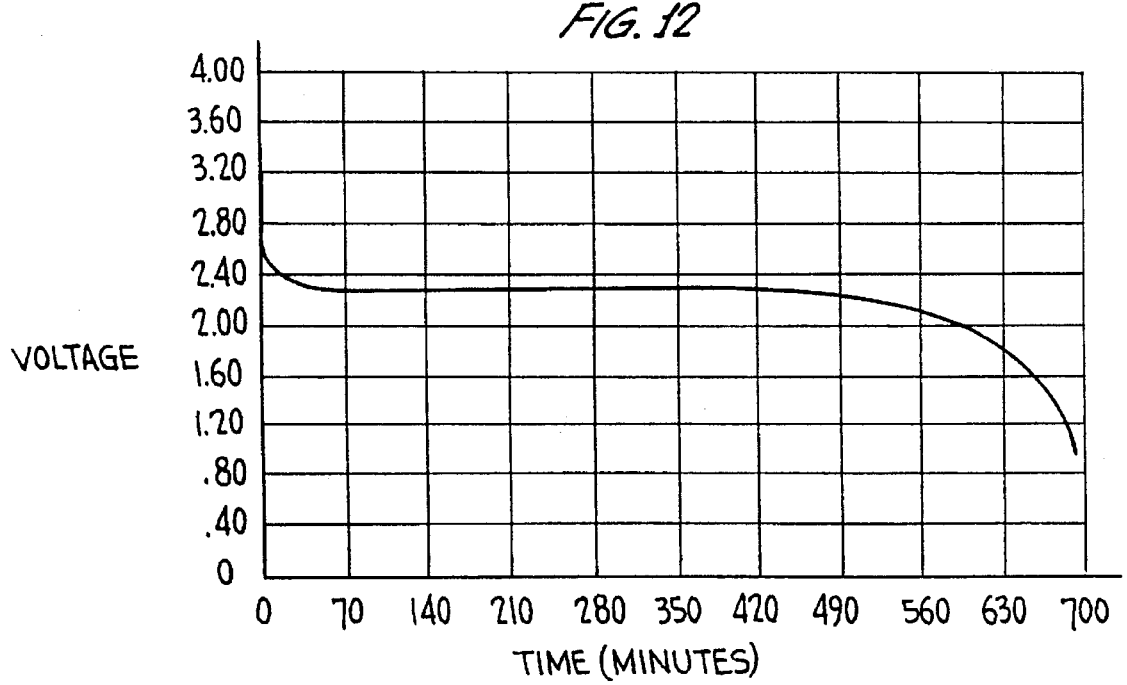
FIG. 12 is a discharge curve for the cell of Example 2.

Cell construction was identical to Example 1 except that the electrolyte employed was a 0.75 Molar solution of lithium bis(Trifluoromethylsulfonyl)imide in a mixture of 5 parts dioxolane, 4 parts dimethoxyethane and 1 part propylene carbonate, all parts by volume. This electrolyte was also formulated to contain less than 100 ppm of water. This cell was also discharged at 1.00 amps at room temperature and the discharge curve shown in FIG. 12. The cell also provided a capacity of 10.1 amp-hours to a 2.0 volt cut-off but operated it an average voltage of 2.45 volts, or 0.20 volts higher than the cell discharge in Example 1.

EXAMPLE 3

The cell described in this example employed a cathode consisting of a mixture of 86% Chemical Manganese Dioxide, 4% Acetylene Black Carbon, 5% Lonza Type KS-44 Carbon and 5% PTFE binder on two layers of aluminum expanded metal binder. Cathode dimensions were 27.50×

Figure 13:
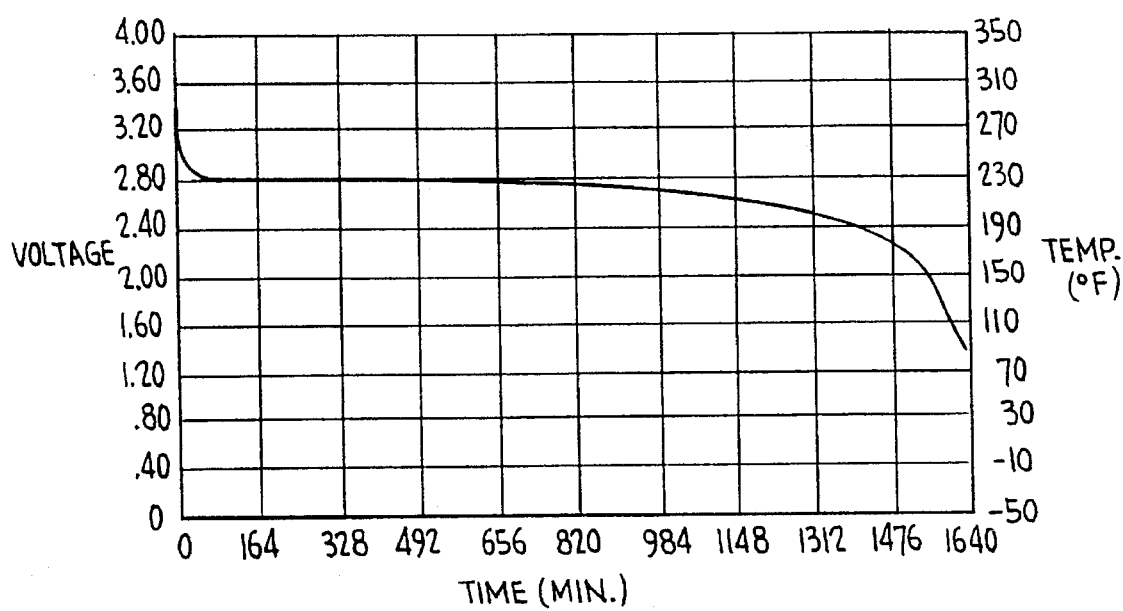
FIG. 13 is a discharge curve for the cell of Example 3.

2.125×0.033 in. The anode consisted of two layers of lithium metal foil 0.006 in. thick laminated to a copper metal foil current collector which was 0.0007 in. thick. Overall anode dimensions were 23.25×2.125×0.0127 in. The anode was encased in a micro-porous polypropylene envelope and the folded electrode configuration formed as described above. The electrodes were placed in the foil laminate/header assembly described in Example 1 with the electrode tabs welded to the internal tabs on the header. The package was sealed shut, evacuated and filled with the same non-aqueous electrolyte employed in Example 2. The fill tube was sealed shut and the cell discharged at 0.500 amps, yielding a capacity of 12.94 amp-hours at an average voltage of 2.65 volts. The discharge curve for this cell is shown in FIG. 13.

Various modifications will be recognized by those skilled in the art based on the present teaching. Thus, although only select preferred embodiments have been specifically illustrated and described herein, it is to be understood that various modifications and embodiments can be utilized to provide the present invention without departing from the spirit of the invention and the scope of the appended claims.

It is claimed:

1. The method of fabricating a electrochemical cell stack comprising:
   A) providing a strip of cathode material having flexibility sufficient to permit folding over of said strip onto itself;
   B) providing a strip of flexible anode material having flexibility sufficient to permit folding over of said onto itself and comprising a lithium foil constructed and arranged with a metal current collector extending along the length of said foil;
   C) providing a flexible, non-conductive separator material between said anode and cathode strips of A and B to prevent electrical contact between said strip and being in contact with an electrolyte; and
   D) folding said anode and cathode strips at right angles to provide a cell stack having at least 3 layers of said anodes and cathodes folded over onto each other at right angles.

2. The method of claim 1 wherein there are at least 3 folds to provide 3 layers of anodes and 4 layers of cathodes.

3. The method of claim 2 wherein said non-conductive flexible separator material is a porous polymeric material.

4. The method of claim 3 wherein said non-conductive flexible separator material is in the form of an envelope.

5. The method of claim 1 wherein said metal current collector is a copper current collector strip inlaid into the surface of said lithium foil.

6. The method of claim 5 wherein said cathode comprises manganese dioxide as the active material.

7. The method of claim 1 wherein the electrolyte is a solid polymer.

8. The method of claim 1 wherein the electrolyte is a liquid electrolyte.

* * * * *

UNITED STATES PATENT AND TRADEMARK OFFICE
CERTIFICATE OF CORRECTION

PATENT NO. : 5,618,318
DATED : April 8, 1997
INVENTOR(S) : Thomas B. Reddy et al It is certified that error appears in the above-indentified patent and that said Letters Patent is hereby corrected as shown below:

Claim 1, column 5, line 28, "folding over of said onto" should read -- folding over of said strip onto --;

Claim 1, column 6, line 6, "contact between said strip" should read -- contact between said strips --.

Signed and Sealed this

Twenty-fifth Day of November, 1997

Attest:

BRUCE LEHMAN

*Attesting Officer*     *Commissioner of Patents and Trademarks*